(12) United States Patent
Homner

(10) Patent No.: US 8,608,213 B2
(45) Date of Patent: Dec. 17, 2013

(54) ARRANGEMENT WITH LOCKING ELEMENT FOR A LOCKING HOOK

(75) Inventor: Bernhard Homner, Stammheim (DE)

(73) Assignee: S-Fasteners GmbH, Magstadt (DE)

( * ) Notice: Subject to any disclaimer, the term of this patent is extended or adjusted under 35 U.S.C. 154(b) by 1049 days.

(21) Appl. No.: 11/950,643

(22) Filed: Dec. 5, 2007

(65) Prior Publication Data

US 2008/0150301 A1    Jun. 26, 2008

(30) Foreign Application Priority Data

Dec. 20, 2006 (DE) ..................... 20 2006 019 165 U

(51) Int. Cl.
*E05B 15/02* (2006.01)

(52) U.S. Cl.
USPC ................. 292/340; 292/341; 292/341.15

(58) Field of Classification Search
USPC .......... 292/340, 341, 341.11, 341.12, 341.13, 292/341.14, 341.15, 341.17
See application file for complete search history.

(56) References Cited

U.S. PATENT DOCUMENTS

| | | |
|---|---|---|
| 309,181 A | 12/1884 | Woodrich |
| 1,093,637 A | 4/1914 | Lint |
| 3,266,831 A | 8/1966 | Banse |
| 3,571,977 A | 3/1971 | Abeel |
| 4,457,146 A * | 7/1984 | Weinerman ..................... 70/100 |
| 4,466,645 A * | 8/1984 | Kobayashi ............... 292/341.12 |
| 4,495,380 A | 1/1985 | Ryan et al. |
| 4,686,783 A | 8/1987 | Bourquard et al. |
| 4,805,366 A | 2/1989 | Long |
| 4,981,313 A * | 1/1991 | Makamura ..................... 292/340 |
| 4,987,714 A | 1/1991 | Lemke |
| 5,036,674 A | 8/1991 | Chang |
| 5,217,339 A | 6/1993 | O'Connor |
| 5,234,238 A * | 8/1993 | Takimoto ...................... 292/216 |
| 5,308,205 A | 5/1994 | Lautenschlager |
| 5,426,905 A | 6/1995 | Rollhauser |
| 5,529,356 A * | 6/1996 | Cetnar ......................... 292/340 |
| 5,529,369 A | 6/1996 | Welborn |
| 5,626,450 A | 5/1997 | Ferrari et al. |
| 5,655,801 A | 8/1997 | Casey |

(Continued)

FOREIGN PATENT DOCUMENTS

| | | |
|---|---|---|
| DE | 1860948 U | 10/1962 |
| DE | 3145155 A1 | 11/1981 |

(Continued)

OTHER PUBLICATIONS

U.S. Appl. No. 11/950,630, Homner.

(Continued)

*Primary Examiner* — Mark Williams
(74) *Attorney, Agent, or Firm* — Woodling, Krost and Rust

(57) ABSTRACT

Arrangement with a locking element for an imaginary mechanical locking arrangement, consisting of the locking element (2) and a locking hook (3) whose hooked part can be connected with the locking element to close the lock. The locking element (2) is part of a single-part or two-part elongated body (4) consisting of curved and/or straight sections. The locking element (2) is located in the recess (6) of a plastic body (5). The parts of the elongated body (4) lying beyond the locking element (2) are, for the most part, embedded in the plastic body (5), where the direction of at least one of these embedded sections is towards the interior of the plastic body (5).

6 Claims, 5 Drawing Sheets

(56) References Cited

U.S. PATENT DOCUMENTS

Figure 1B:
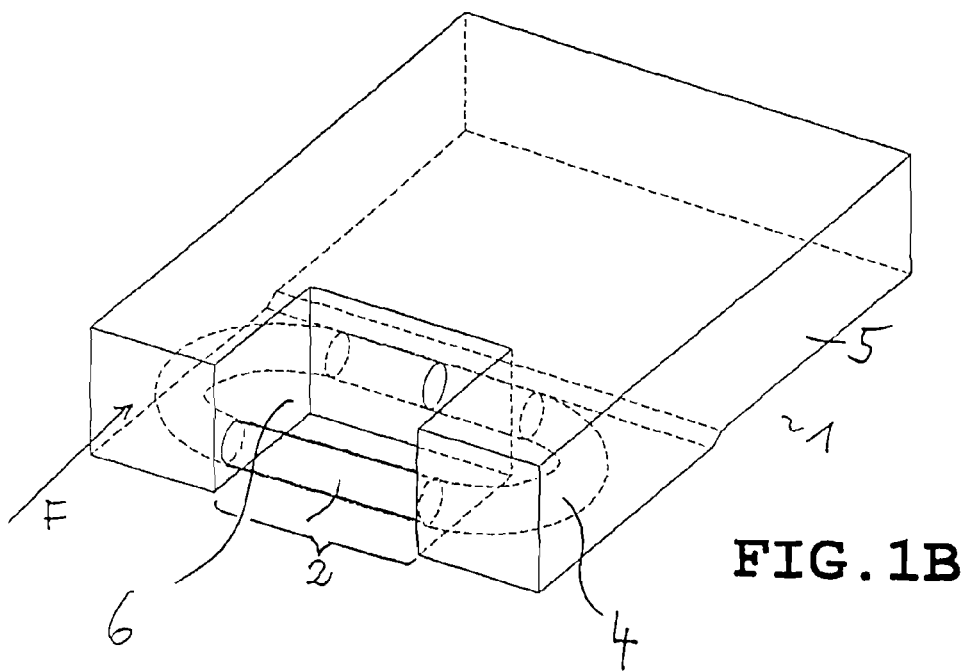
Figure 1A:
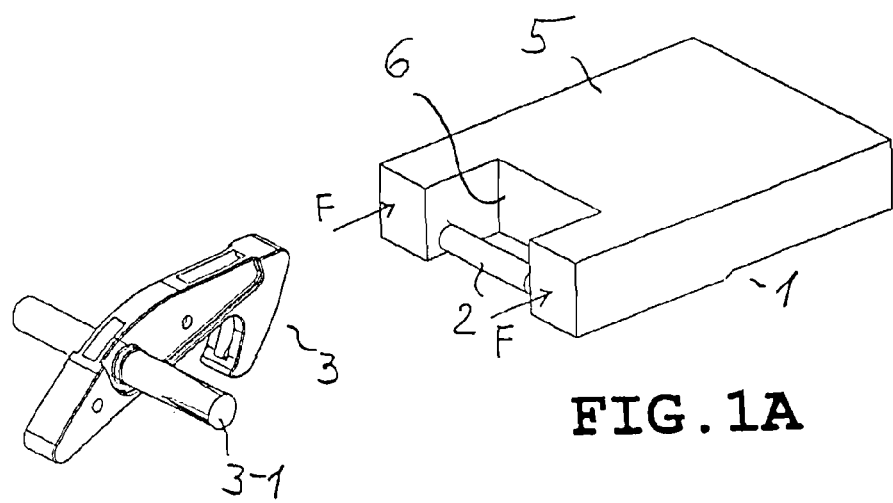

| | | | |
|---|---|---|---|
| 5,707,092 A * | 1/1998 | Van Slembrouck et al. | 292/341.19 |
| 5,782,511 A | 7/1998 | Schwarz | |
| 6,000,737 A * | 12/1999 | Yiu | 292/340 |
| 6,149,210 A | 11/2000 | Hunt | |
| 6,381,811 B2 | 5/2002 | Smith et al. | |
| 6,409,446 B1 | 6/2002 | Schwarz | |
| 6,442,806 B1 | 9/2002 | Wesson | |
| 6,443,679 B1 | 9/2002 | Schwarz | |
| 6,497,436 B1 | 12/2002 | DeBlock | |
| 6,631,933 B1 * | 10/2003 | Westerwick | 292/340 |
| 6,672,634 B2 * | 1/2004 | Burton | 292/340 |
| 6,679,530 B2 | 1/2004 | Krynski | |
| 6,736,438 B1 | 5/2004 | Wieclawski | |
| 6,837,661 B2 | 1/2005 | Schwarz et al. | |
| 6,846,125 B2 | 1/2005 | Smith et al. | |
| 6,866,227 B2 | 3/2005 | Pratt | |
| 6,908,144 B2 | 6/2005 | Gotzinger et al. | |
| 7,004,517 B2 * | 2/2006 | Vitry et al. | 292/213 |
| 7,107,697 B2 | 9/2006 | Schwarz et al. | |
| 7,179,039 B2 | 2/2007 | Schwartz et al. | |
| 7,234,209 B2 | 6/2007 | Totani et al. | |
| 7,524,131 B2 | 4/2009 | Schwarz et al. | |
| 7,533,911 B2 | 5/2009 | Homner | |
| 7,703,818 B2 * | 4/2010 | Fannon et al. | 292/340 |
| 2004/0115030 A1 | 6/2004 | Schwarz | |
| 2004/0240933 A1 | 12/2004 | Schwarz et al. | |
| 2007/0147975 A1 | 6/2007 | Homner | |
| 2007/0158955 A1 | 7/2007 | Homner | |
| 2008/0157543 A1 | 7/2008 | Homner | |
| 2008/0273922 A1 | 11/2008 | Homner | |

FOREIGN PATENT DOCUMENTS

| | | |
|---|---|---|
| DE | 8710288 U1 | 10/1987 |
| DE | 3623311 A1 | 1/1988 |
| DE | 3922025 C1 | 9/1990 |
| DE | 4239908 C1 | 3/1994 |
| DE | 19707634 A1 | 10/1997 |
| DE | 29808914 U1 | 9/1998 |
| DE | 29914145 U1 | 12/2000 |
| DE | 10040410 A1 | 1/2001 |
| DE | 19943083 A1 | 12/2001 |
| DE | 20218302 U1 | 3/2003 |
| DE | 10355780 A1 | 6/2005 |
| DE | 102004011183 A1 | 9/2005 |
| DE | 102006008655 A1 | 9/2006 |
| DE | 202006019165.8 | 8/2007 |
| DE | 202007000112.6 | 8/2007 |
| EP | 0189569 B1 | 2/1989 |
| EP | 0784141 A1 | 7/1997 |
| EP | 06026133 | 3/2007 |
| EP | 07004742 | 5/2007 |
| EP | 07024364 | 6/2008 |
| EP | 07024365 | 6/2008 |
| GB | 1268022 | 3/1972 |
| GB | 1506902 | 4/1978 |
| GB | 2050487 A | 1/1981 |
| GB | 2219342 A | 12/1989 |
| JP | 2000310210 A | 7/2000 |
| WO | 80/00162 A1 | 2/1980 |

OTHER PUBLICATIONS

U.S. Appl. No. 11/682,099, Homner.
European Patent Application Serial # 07024365, European Search Report, Jun. 13, 2008, Homner, Entire Document.
European Patent Application Serial # 07024364, European Search Report, Jun. 13, 2008, Homner, Entire Document.
European Patent Application Serial # 06026133, European Search Report, Mar. 23, 2007, Homner, Entire Document.
European Patent Application Serial # 07004742, European Search Report, May 20, 2007, Homner, Entire Document.
U.S. Appl. No. 12/478,490, filed Jun. 4, 2009, Inventor: Homner.

* cited by examiner

ARRANGEMENT WITH LOCKING ELEMENT FOR A LOCKING HOOK

The invention refers to mechanical locking arrangements where a locking hook hooks around a locking element to close the lock.

Locking arrangements of this kind are described in, for example, the German utility model no. 298 08 914.9, which are suitable, among other things, for locks for luggage boxes in aircraft. This utility model describes a locking arrangement, by means of which a locking catch joined to a container can be engaged by the hook element of a locking hook attached to a hinged cover in order to close the container.

In aircraft construction, such locks are subject to high requirements. They must withstand high strains while being low in weight and size in order to fulfil certain spatial design specifications.

The object of the invention is to provide an improved arrangement with a locking element (for a locking hook). Such an improved arrangement should, in particular, provide maximum resistance to strain and have a low weight. For reasons of space, the locking process should take place near to or at the front side of the arrangement embracing the locking element and facing the locking hook.

In addition, the improved arrangement should also provide a possibility for compensating for different distances between the locking element and the locking hook during assembly.

Practical applications of the invention are shown in the drawings and are described in more detail below.

FIG. 1A

A schematic perspective exploded view of a locking hook (with hinge axis) and the arrangement according to invention with a locking element (shown from the outside).

FIG. 1B

A schematic perspective view of the arrangement according to invention with a elongated body forming a shape similar to an oval, which is divided into two imaginary parts, of which one part serves as a locking element and the other part is embedded in a plastic body.

FIG. 1C

A sectional view of the locking hook and the locking element in locking position.

FIGS. 2A, 2B, 2C, 2D, 2E

Perspective views of different variations of a single-part elongated body and a two-part elongated body arrangement for the arrangement according to invention:

FIG. 2A

Single-part, oval, closed elongated body, where the locking element is formed by one section of the elongated body and the other part of the elongated body is intended to be embedded in the plastic body.

FIG. 2B

Single-part, circular elongated body with open ends, where the locking element is formed by one section of the elongated body and the other part of the elongated body is intended to be embedded in the plastic body.

FIG. 2C

Single-part, rectangular elongated body with open ends, where the locking element is formed by the two end parts of the elongated body and the other part of the elongated body is intended to be embedded in the plastic body.

FIG. 2D

Two-part elongated body arrangement, consisting of two equal parts of U-shape, which are arranged in such a way that the locking element is formed by the end parts of the two legs of the U pointing at one another, and where the other parts of both parts are intended to be embedded in the plastic body.

FIG. 2E

Single-part U-shaped elongated body where the locking element is formed by the end part of a leg of the U (projecting freely into the recess of the plastic body), and the other part of the elongated body is intended to be embedded in the plastic body.

FIG. 3

Figure 2A:
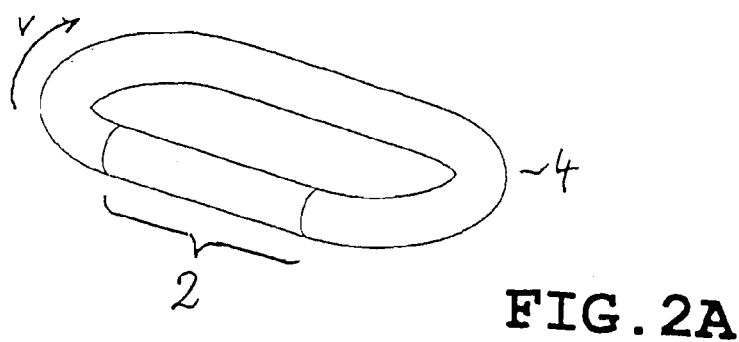
Figure 2B:
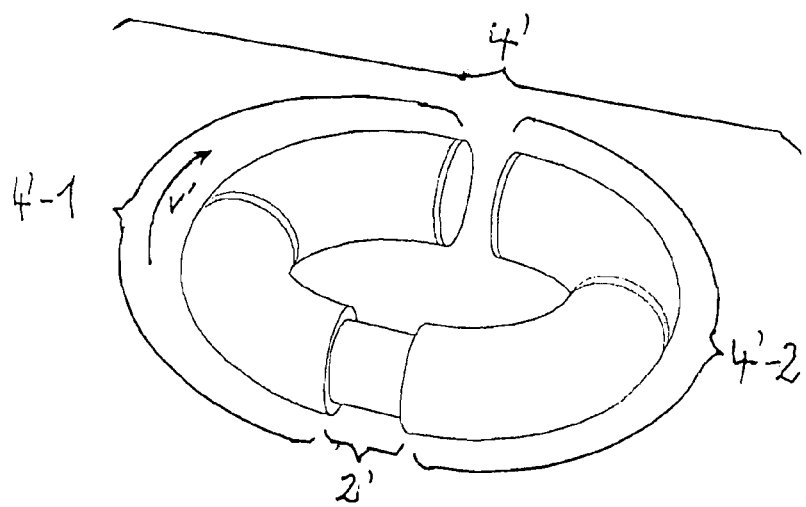
Figure 2E:
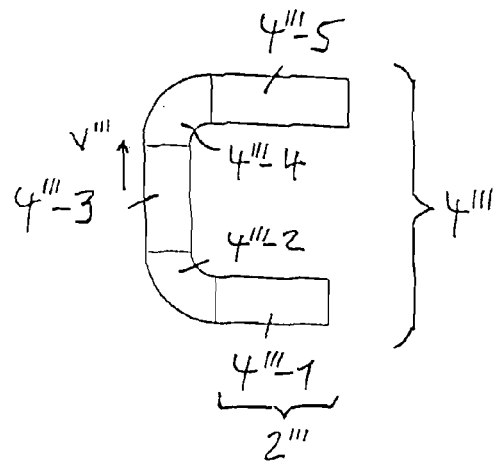
Figure 2C:
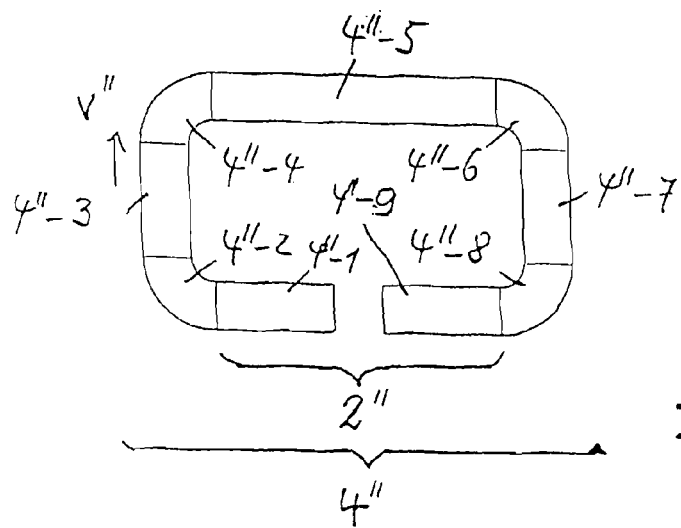
Figure 2D:
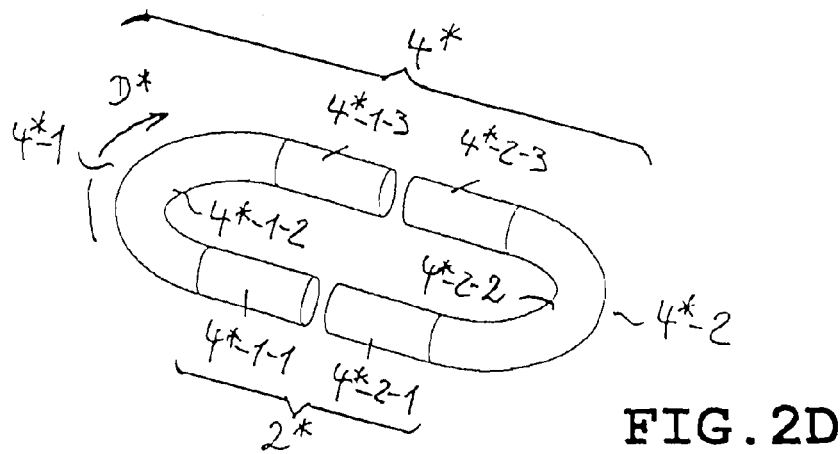

A schematic perspective view of the arrangement according to invention with a elongated body according to FIG. 2D, where the locking element hooks around parts of the elongated body and a rotating sleeve surrounding the elongated body.

FIG. 4

A perspective view of the rotating sleeve.

FIG. 5A

A partial perspective view of an arrangement according to invention with engaging setting for a selectable engaging position.

FIG. 5B

Figure 5A:
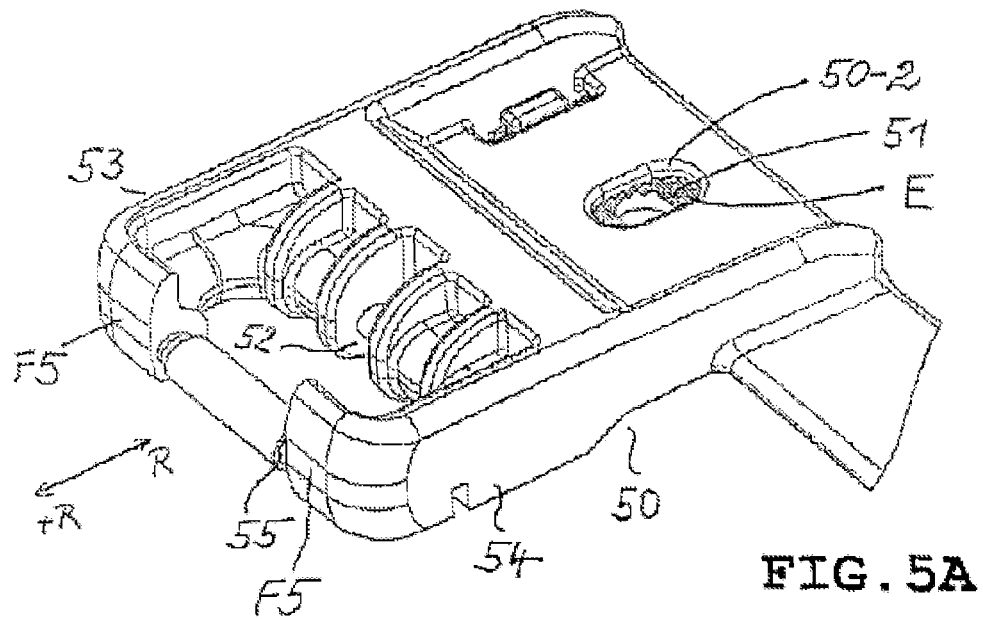

A partial perspective view of an arrangement according to FIG. 5A seen from its lower side with a view of an engaging element no longer attached to the plastic body.

Locking arrangements of the type described above may be used, for example, lock the hinged cover of a container into place.

For this purpose, a hinged locking hook is located on the container cover and a locking element on the container. To close the lock, the hook part of the locking hook hooks sufficiently around the locking element.

The object of the invention is a specially shaped arrangement with a locking element as part of a elongated body, most of which is embedded in a plastic body.

FIG. 1A shows

A schematic perspective exploded view of a locking hook 3 (with hinge axis 3-1) and the arrangement 1 according to invention, consisting of a schematically represented plastic body 5 with a locking element 2 (shown from the outside). After appropriate rotation of the locking hook, the hook part of the locking hook 3 hooks around the locking element 2 (not entirely, but enough to form a lock).

The front side of the plastic body 5 facing the locking hook 3 is marked with the letter F.

On its front side F, the plastic body 5 has a recess 6 in which the locking element 2 is located. The recess 6 is large enough to allow the hook part of the locking hook to engage and disengage from the locking element.

The design requirement that, for spatial reasons, the locking element 2 (as part of a elongated body 4 (see FIG. 1B and FIG. 2A)) should be located on or close to the front side F of the plastic body (facing the imaginary locking hook) necessitates sound attachment of the elongated body 4 in the plastic body 5, in view of the high strain to which the locking element is exposed.

For this reason, the elongated body 4 extends beyond the part acting as the locking element, and is embedded for the most part in the plastic body 5.

FIG. 1B shows a schematic perspective view of the arrangement 1 according to invention with a elongated body 4 forming a shape similar to an oval, with a circular cross-section, which is divided into two imaginary parts, of which one part serves as a locking element 2 and the remaining part is embedded in the plastic body 5.

Figure 1C:
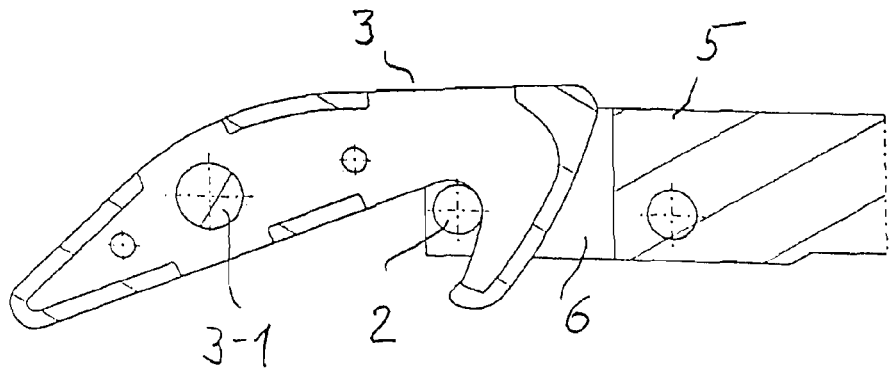

FIG. 1C shows a sectional view of the locking hook 3 with rotation axis 3-1 and of the locking element 2 in locking position. The locking element 2 is located in the recess 6 of the plastic body 5.

FIGS. 2A, 2B, 2C, 2D and 2E show perspective views of different variations of a single-part elongated body and a two-part elongated body arrangement for the arrangement according to invention.

Of particular importance for a secure attachment of the elongated body 4 in the plastic body 5 are the areas whose direction (v) is inwards away from the front side (F) of the plastic body 5 towards its interior, and those in the interior of the plastic body which are, if possible parallel to the locking element.

The locking element is preferably of steel and may be either straight or curved.

FIG. 2A shows a single-part, oval, closed elongated body 4 according to FIG. 1B.

The locking element 2 is formed by one section of the elongated body of which other part is intended to be embedded in the plastic body 5.

FIG. 2B shows a single-part, circular elongated body 4' with open ends. The locking element 2' is formed by one section of the elongated body. The other part of the elongated body is intended to be embedded in the plastic body.

FIG. 2C shows a single-part, rectangular-shaped elongated body 4" with open ends. It has straight parts (4"-1, 4"-3, 4"-5, 4"-7 and 4"-9) and curved parts (4"-2, 4"-4, 4"-6, and 4"-8). The locking element 2" is formed by the two end parts 4"-1 and 4"-9 of the elongated body. The other parts of the elongated body are intended to be embedded in the plastic body.

FIG. 2E shows a single-part U-shaped elongated body 4''', which has straight parts (4'''-1, 4'''-3 and 4'''-5) and curved parts (4'''-2 and 4'''-4). The locking element 2''' is formed by the end part 4'''-1, which as an arm with one free end is attached to the plastic body on one side only. The other parts of the elongated body 4''' are intended to be embedded in the plastic body.

FIG. 2D shows a two-part elongated body arrangement 4*, consisting of two equal parts 4*-1 and 4*-2 of U-shape. Each part consists of two straight legs of the U (4*-1-1 and 4*-1-3; 4*-2-1, 4*-2-3) and a curved base (4*-1-2; 4*-2-2). Both parts are arranged (in the plastic body) in such a way that the locking element 2* is formed by the end areas (4*-1-1 and 4*-2-1) of the two parts pointing at one another. The other areas of both parts are intended to be embedded in the plastic body.

Figure 3:
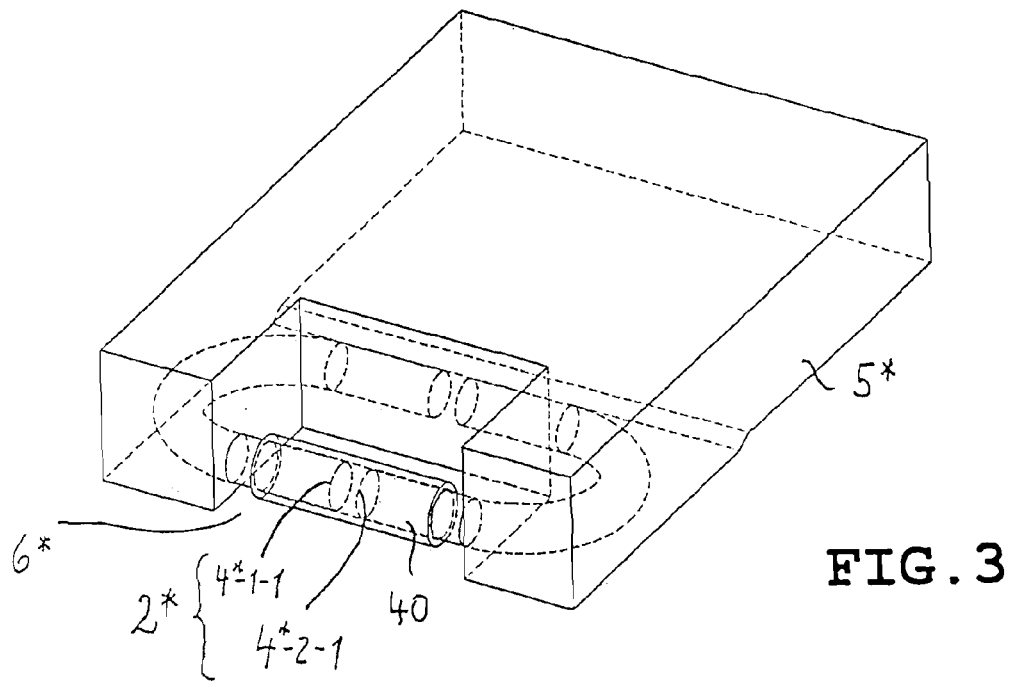

FIG. 3 shows a schematic perspective view of the arrangement 1* according to invention with a elongated body 4* according to FIG. 2D. The locking element 2* is located in the recess 6* of the plastic body. It consists of one leg of the U of the separately arranged U-shaped parts 4*1 and 4*-2. The locking element is surrounded by a rotating sleeve 40 (see also FIG. 4).

Figure 4:
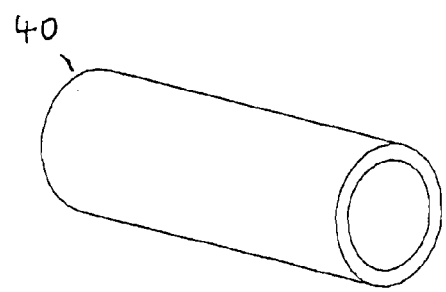

FIG. 4 shows a perspective view of the rotating sleeve 40. When the lock is closed, the rotating sleeve is embraced by the hook part of the imaginary locking hook. It is located rotatably on the locking element 2*. The rotating sleeve is preferably coated on the inside and outside with a layer of anti-friction material, in particular a paint containing graphite or PTFE (Teflon).

Figure 5B:
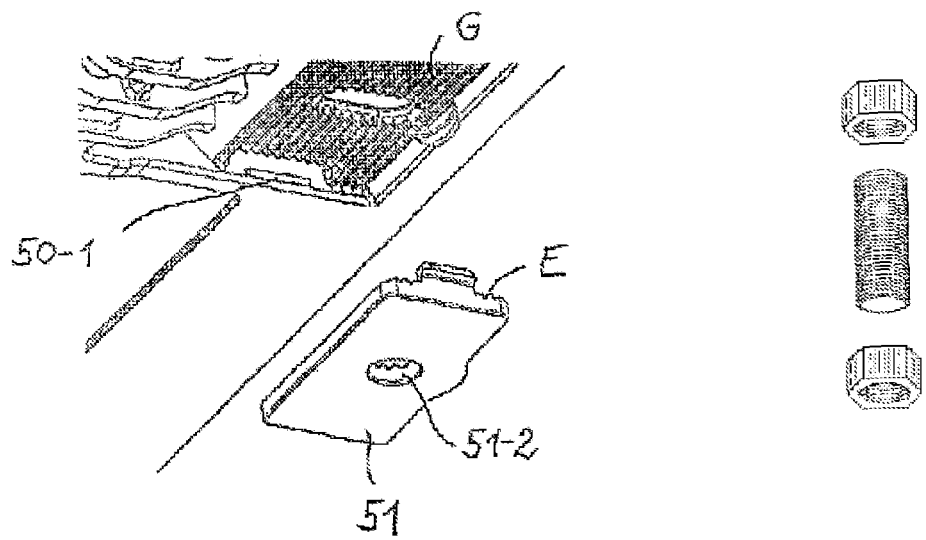

FIG. 5A shows a partial perspective view of an adjustable arrangement according to invention with a setting for a selectable engaging position, and FIG. 5B shows a partial perspective view of an arrangement according to FIG. 5A seen from its lower side with a view of an engaging element 51 no longer attached to the plastic body 50. The adjustable arrangement comprises a plastic body 50 which can be attached to an imaginary component in a selectable engaging position in direction +R towards the imaginary locking hook or in the contrary direction −R.

The plastic body 50 has engaging grooves G adjacent to one another and at right angles to the direction +/−R. An engaging element 51 guided in direction +/−R may be arranged in the plastic body 50. It is guided in a slot 50-1 whose length and width depends on the catch location.

The engaging element also has engaging grooves E adjacent to one another and at right angles to the direction +/−R. The engaging grooves G, E of the plastic body 50 and the engaging element 51 can hook into one another.

The plastic body 50 may be raised, lowered or moved in direction +/−R with reference to the engaging element 51 to select an engaging position in an area of the slot limited by the catch.

To attach the plastic body 50 and the engaging element 51 to the imaginary component, a releasable connection (not shown) by means of a stud bolt is provided, where the stud bolt passes through a slot 50-2 in the plastic body 50 running in direction +/−R and through a correspondingly aligned hole 51-2 in the engaging element 51. When a selected engaging position is reached, the plastic body 50 is prevented from lifting off the engaging element 51 by the tensioned stud bolt which is connected to the component. In order to select a different engaging position, the stud bolt must be loosened temporarily in order to set the new position.

The parts of the elongated body beyond the locking element do not necessarily all have to be embedded in the plastic body.

As FIG. 5A shows, embedding in a certain area (e.g. 52) is not essential. However, in order to ensure secure attachment, the parts of the elongated body beyond the locking element are however embedded in the plastic body.

The material used for the plastic body is preferably polythermide.

The plastic body 50 has two projections 53, 54 at a distance from one another, between the ends of which the locking element 55 is located. For this form of the arrangement, the front surface F5 of the plastic body is formed by the outer surfaces of the parts 56 and 57 of the projections pointing inwards.

The invention claimed is:

1. A mechanical locking arrangement, comprising:
a plastic body, said plastic body includes a front side and an interior, said plastic body includes a recess, said plastic body includes first and second projections spaced apart from one another, said first projection includes a first end portion and said second projection includes a second end;
an integral elongated body, said integral elongated body is generally oval shaped and includes curved portions and straight portions, one of said straight portions of said elongated body is a locking element, said locking element resides between said first end portion of said first projection and said second end portion of said second projection, said integral elongated body, except for said locking element, being substantially embedded in and surrounded by said interior of said plastic body, said first projection of said plastic body, said second projection of said plastic body, said first end of said first projection of said plastic body and said second end of said second projection of said plastic body;
said locking element of said integral elongated body resides in said recess of said plastic body on said front side of said plastic body, a locking hook, said locking hook includes a hooked part, said hooked part engages said locking element of said integral elongated body and secures said hooked part with respect to said locking element of said elongated body;

adjustment means for positioning said locking element with respect to said hooked part of said locking hook; and, said locking element spaced from said plastic body to allow said hooked part of said locking hook to extend over said locking element and reside between said plastic body and said locking element.

2. A mechanical locking arrangement, comprising:

an integral elongated body, said integral elongated body is generally oval shaped and includes curved portions and straight portions, and, one of said straight portions of said elongated body is a locking element;

a locking hook, said locking hook includes a hooked part, said hooked part engages said locking element of said integral elongated body and secures said hooked part with respect to said locking element of said integral elongated body;

a plastic body, said plastic body includes a front side and an interior, and, said plastic body includes a recess;

said locking element of said integral elongated body resides in said recess of said plastic body on said front side of said plastic body, and, said locking element spaced from said plastic body to allow said hooked part of said locking hook to extend over said locking element and reside between said plastic body and said locking element;

said integral elongated body, except for said locking element, being substantially embedded in and surrounded by said interior of said plastic body;

said plastic body includes engaging grooves (G) adjacent to one another, and, said engaging grooves (G) of said plastic body include alternating ridges and valleys;

an engaging element;

said engaging element includes engaging grooves (E) adjacent to one another, and, said engaging grooves (E) of said engaging element include alternating ridges and valleys;

and, said ridges of said engaging grooves (G) of said plastic body adjustably interengage said valleys of said engaging grooves (E) of said engaging element and said ridges of said engaging grooves (E) of said engaging element adjustably interengage said valleys of said engaging grooves (G) of said plastic body enabling relative movement and positioning of said plastic body and said locking element with respect to said engaging element and enabling relative movement and positioning of said plastic body and said locking element with respect to said hooked part of said locking hook enabling said hooked part of said locking hook to engage said locking element of said integral elongated body and secure said hooked part of said locking hook with respect to said locking element of said integral elongated body.

3. A mechanical locking arrangement according to claim 2, further comprising a releasable connection means for positioning said plastic body with respect to said engaging element.

4. A mechanical locking arrangement according to claim 3, wherein said releasable connection means includes a slot in said plastic body and a hole in said engaging element.

5. A mechanical locking arrangement as claimed in claim 4 wherein said releasable connection means further includes a stud for connecting said engaging element and said plastic body.

6. A mechanical locking arrangement as claimed in claim 2 wherein said plastic body and said locking element may be raised vertically, lowered vertically or moved in the direction +/−R with respect to said engaging element.

* * * * *